(12) United States Patent
Yamashita

(10) Patent No.: US 11,113,369 B2
(45) Date of Patent: Sep. 7, 2021

(54) INFORMATION PROCESSING APPARATUS, AUTHENTICATION SYSTEM, AND METHOD OF DELETING CARD INFORMATION

(71) Applicant: Akihiro Yamashita, Kanagawa (JP)

(72) Inventor: Akihiro Yamashita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 16/186,809

(22) Filed: Nov. 12, 2018

(65) Prior Publication Data
US 2019/0205509 A1   Jul. 4, 2019

(30) Foreign Application Priority Data

Jan. 4, 2018   (JP) .............................. JP2018-000335

(51) Int. Cl.
*G06F 21/31* (2013.01)
*G06F 21/60* (2013.01)
(Continued)

(52) U.S. Cl.
CPC .............. *G06F 21/31* (2013.01); *G06F 21/34* (2013.01); *G06F 21/608* (2013.01);
(Continued)

(58) Field of Classification Search
CPC ........ G06F 21/31; G06F 21/608; G06F 21/34; G06F 21/6209; H04L 63/0853;
(Continued)

(56) References Cited

U.S. PATENT DOCUMENTS

| 8,365,265 | B2* | 1/2013 | Ueno | ...................... G06F 21/34 726/7 |
| 2004/0092231 | A1* | 5/2004 | Ayatsuka | ............... H04W 12/08 455/41.2 |

(Continued)

FOREIGN PATENT DOCUMENTS

| JP | 2003-046499 | 2/2003 |
| JP | 2009-187559 | 8/2009 |

(Continued)

OTHER PUBLICATIONS

European Search Report for corresponding European Application No. 18210329 dated Feb. 12, 2019.

(Continued)

*Primary Examiner* — Daniel B Potratz
*Assistant Examiner* — Wansik You
(74) *Attorney, Agent, or Firm* — Harness, Dickey & Pierce, P.L.C.

(57) ABSTRACT

An information processing apparatus that manages card-related information relating to a card used by a user for authentication, includes a memory configured to store a plurality of instructions, which when executed by one or more processors, cause the one or more processors to acquire identification information of the card. The one or more processors are further caused to store, in a memory, the identification information of the card and a request date and time in association with each other in response to acquiring an authentication request using the card. The one or more processors are further caused to, when a predetermined time period or more has passed from the request date and time at a predetermined timing, delete the card-related information associated with the identification information of the card corresponding to the request date and time from which the predetermined time period or more has passed.

11 Claims, 11 Drawing Sheets

(51) Int. Cl.
*H04L 29/06* (2006.01)
*G06F 21/34* (2013.01)
*H04W 12/06* (2021.01)
*H04N 1/44* (2006.01)
*H04N 1/32* (2006.01)
*G06F 21/62* (2013.01)
*H04W 4/80* (2018.01)

(52) U.S. Cl.
CPC ...... *G06F 21/6209* (2013.01); *H04L 63/0853* (2013.01); *H04L 63/107* (2013.01); *H04L 63/108* (2013.01); *H04W 12/06* (2013.01); *H04N 1/32101* (2013.01); *H04N 1/4426* (2013.01); *H04N 1/4433* (2013.01); *H04N 2201/0094* (2013.01); *H04W 4/80* (2018.02)

(58) Field of Classification Search
CPC .... H04L 63/108; H04L 63/107; H04W 12/06; H04W 4/80; H04N 1/4433; H04N 2201/0094; H04N 1/32101; H04N 1/4426
See application file for complete search history.

(56) References Cited

U.S. PATENT DOCUMENTS

| | | |
|---|---|---|
| 2005/0086654 A1 | 4/2005 | Sumi et al. |
| 2008/0046553 A1 | 2/2008 | Yamashita |
| 2008/0094657 A1 | 4/2008 | Ikegami et al. |
| 2011/0066722 A1 | 3/2011 | Yamashita |
| 2011/0231581 A1 | 9/2011 | Yamashita |
| 2012/0099136 A1* | 4/2012 | Ueda .................. G06Q 20/346 358/1.14 |
| 2012/0120451 A1 | 5/2012 | Ikegami et al. |
| 2013/0042181 A1 | 2/2013 | Yamashita |
| 2013/0268860 A1 | 10/2013 | Yamashita |
| 2014/0068447 A1 | 3/2014 | Yamashita |
| 2015/0018091 A1* | 1/2015 | Suzuki .................. A63F 13/795 463/29 |
| 2016/0105568 A1 | 4/2016 | Yamashita |
| 2016/0321443 A1* | 11/2016 | Ishibashi ................ G06F 21/33 |
| 2016/0337335 A1* | 11/2016 | Satoh .................... H04L 63/205 |
| 2017/0322826 A1* | 11/2017 | Furuhashi .......... G06F 11/3433 |
| 2018/0032708 A1 | 2/2018 | Mori et al. |
| 2018/0260178 A1 | 9/2018 | Yamashita |

FOREIGN PATENT DOCUMENTS

| | | |
|---|---|---|
| JP | 2010-272087 | 12/2010 |
| JP | 2013-239202 | 11/2013 |
| JP | 2014-215984 | 11/2014 |
| JP | 6090386 B2 | 3/2017 |
| JP | 2017-212737 A | 11/2017 |

OTHER PUBLICATIONS

Japanese Office Action with dispatch No. 556776 issued by the Japanese Patent Office dated Jun. 8, 2021 for Japanese Patent Application No. 2018-000335.

* cited by examiner

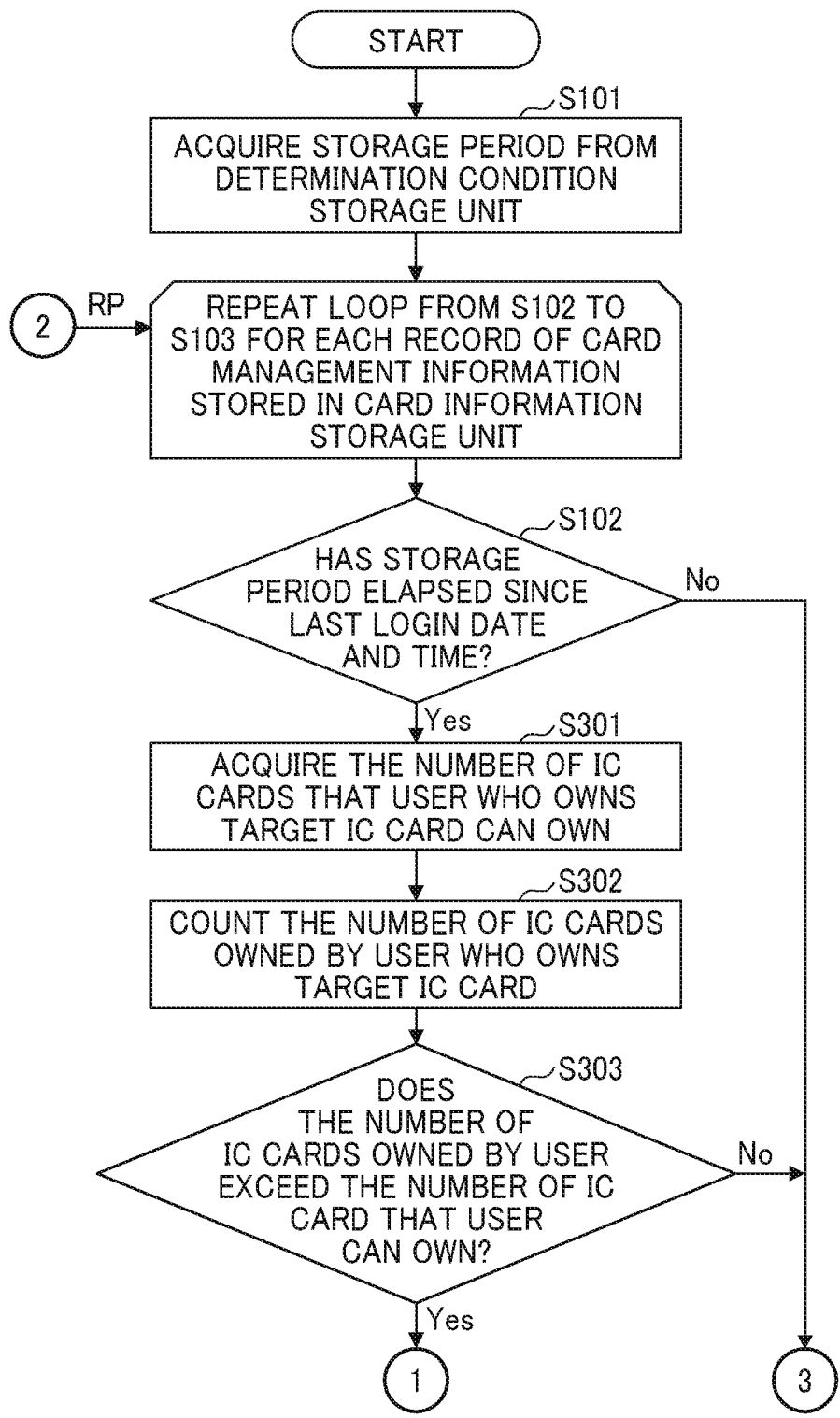

INFORMATION PROCESSING APPARATUS, AUTHENTICATION SYSTEM, AND METHOD OF DELETING CARD INFORMATION

CROSS-REFERENCE TO RELATED APPLICATION

This patent application is based on and claims priority pursuant to 35 U.S.C. § 119(a) to Japanese Patent Application No. 2018-000335, filed on Jan. 4, 2018, the entire disclosure of which is incorporated herein by reference.

BACKGROUND

Technical Field

The present disclosure relates to an information processing apparatus, an authentication system, and a method of deleting card information.

Description of the Related Art

In companies or the like, there is a demand to place a limit on users who can use electronic devices such as image forming apparatuses or to place a limit on functions of the electronic devices that can be used according to users' authorizations. This is based on an intention of permitting use of an electronic device only to staffs belonging to a particular department or preventing general users from changing important settings. For this reason, authentication of a user is sometimes performed before use of an electronic device. When the user is authenticated, the user can log in to the electronic device and use the electronic device.

As one example of the authentication, a user enters a user name and a password on a control panel of an electronic device to log in to the electronic device. However, it takes time to enter a user name and a password. For this reason, many electronic devices have functions of authenticating a user using an IC (integrated circuit) card. Each user registers his or her own IC card in advance in an image forming apparatus, an authentication apparatus or the like. When a user is to log in to the image forming apparatus as an example of an electronic device, the user holds the IC card over a card reader installed in the image forming apparatus or connected to the image forming apparatus. This saves the user from having to enter a user name and a password.

Although an administrator can register IC cards, each user also can register his or her own IC card in advance. However, in a case where a user owns plural IC cards or in a case where an IC card that a user owns is changed, information of an old IC card continues to remain in the image forming apparatus or the authentication apparatus. Although the administrator can delete information of a user's IC card manually, the administrator cannot judge which IC card is old. In addition, even when the user's IC card is old, the administrator cannot judge whether any problem will raise if he or she deletes information of the old card.

SUMMARY

In an example embodiment of the present disclosure, an information processing apparatus that manages card-related information relating to a card used by a user for authentication, includes a memory configured to store a plurality of instructions, which when executed by one or more processors, cause the one or more processors to acquire identification information of the card. The one or more processors are further caused to store, in a memory, the identification information of the card and a request date and time in association with each other in response to acquiring an authentication request using the card. The one or more processors are further caused to, when a predetermined time period or more has passed from the request date and time at a predetermined timing, delete the card-related information associated with the identification information of the card corresponding to the request date and time from which the predetermined time period or more has passed.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 10A and 10B (FIG. 10) is a flowchart illustrating an example of a process of periodically deleting one or more records of the card management information in the card information storage unit by the periodic maintenance unit, according to still another embodiment of the present disclosure;

Figure 1:
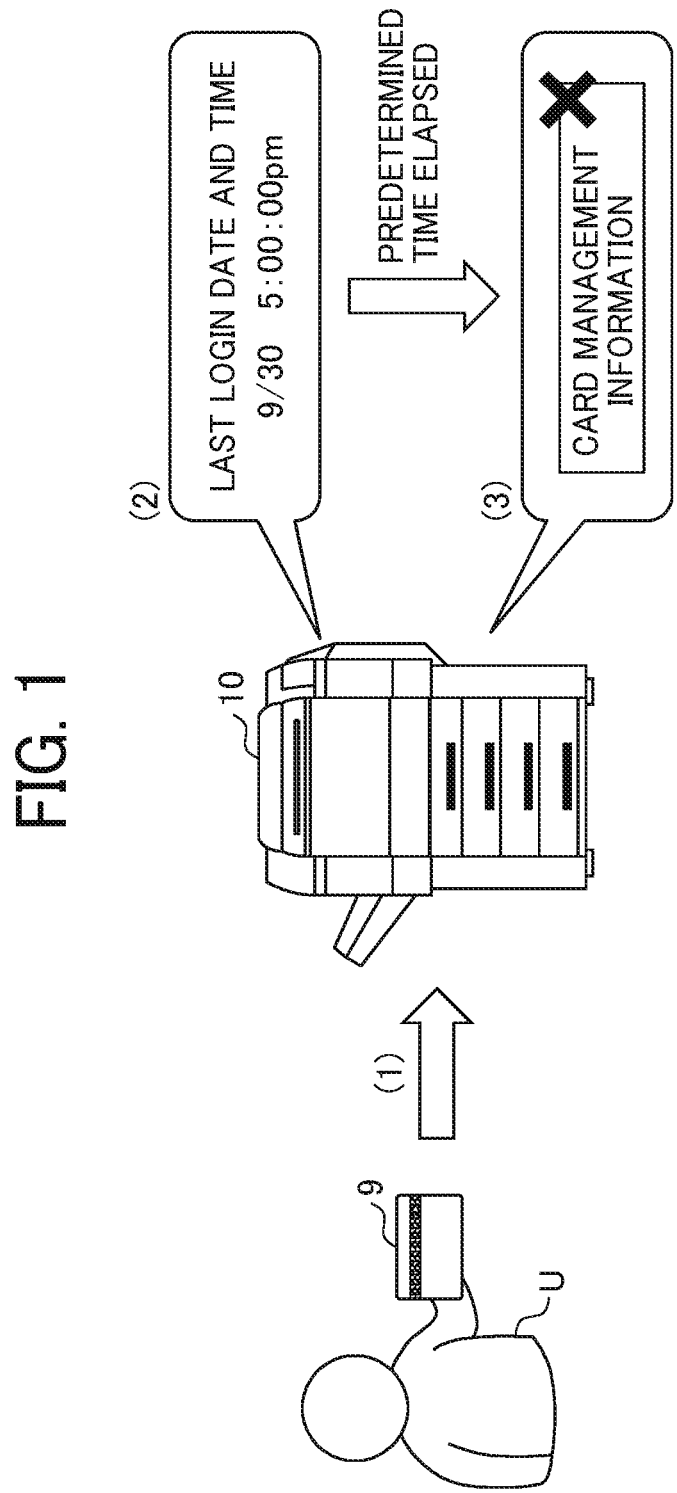
FIG. 1 is a schematic diagram illustrating operation of an electronic apparatus, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, a description is given of an authentication system 100 and a method of deleting card information performed by the authentication system 100, according to embodiments of the present disclosure.

First Embodiment

<Overview of Operation>

In the present embodiment, when an authentication using an IC (integrated circuit) card is requested, an electronic apparatus or the like holds a request date and time in association with the IC card used for login. A record of card management information (managed card-related information) including a last login date and time from which a predetermined period has passed is deleted. This enables to delete card management information of an IC card not being used, even if a user does not specify an IC card to be deleted.

FIG. 1 is a schematic diagram illustrating operation of an electronic apparatus 10, according to an embodiment of the present disclosure.

(1) User U logs in to an electronic apparatus 10 using an IC card 9.

(2) The electronic apparatus 10 records a last login date and time in association with a card ID.

(3) The electronic apparatus 10 deletes a record of card management information corresponding to a specific IC card for which a predetermined time period has elapsed since the last login date and time.

Since old card management information is automatically deleted with the operation from (1) to (3), information of an IC card not being used is deleted, even if the user U does not select an IC card to be deleted.

<Terms Used in the Embodiments>

An authentication request using a card means sending a request for authentication together with at least a part of information stored in the card. The card is a sheet-shaped or plate-shaped storage medium capable of storing information.

The request date and time is a date and time when the user performs an operation for the authentication request. The request date and time can be any suitable date and time relating to an authentication process. For example, the request date and time is a date and time when authentication is established by the authentication request. In another example, the request date and time is a date and time when the authentication request is performed although an authentication is not established. In still another example, the request date and time is a period from an operation of the authentication request to a date and time when an authentication is established.

A predetermined timing is a timing when determination as to whether a predetermined period or more has elapsed since the request date and time is performed. An expired card is a card in which the predetermined period or more has elapsed since the request date and time was performed and a non-expired card is a card in which the predetermined period or more has not elapsed since the request date and time was performed. In the present embodiment, a description is given of an example in which the determination is performed periodically. In another example, the determination as to whether a predetermined period or more has elapsed since the request date and time is performed at a desired timing. In other words, the predetermined timing is a current date and time when an elapsed time from the request date and time is calculated.

At least a part of information relating to a card (card-related information) associated with identification information of the card includes the information stored in the card.

<Example of System Configuration>

Figure 2:
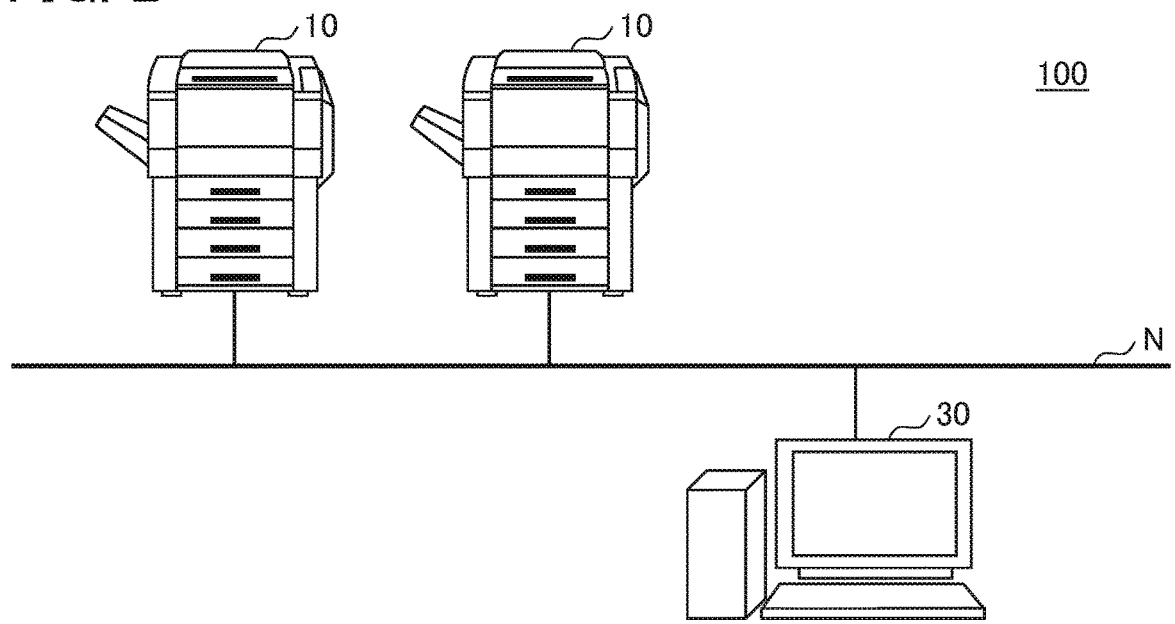
FIG. 2 is a schematic diagram illustrating an example of a system configuration of an authentication system, according to an embodiment of the present disclosure.

FIG. 2 is a schematic diagram illustrating an example of a system configuration of the authentication system 100, according to the present embodiment. The authentication system 100 includes one or more electronic apparatuses 10 and an authentication server apparatus 30, which are communicable with one another via a network N.

The network N is implemented by, for example, a local area network (LAN) provided in a site where the electronic apparatus 10 is located, a provider network provided by a provider that connects the LAN to the Internet, and a line provided by a carrier. When the network N includes a plurality of LANs, the network N is called a wide area network (WAN) or the Internet. In another example, the network N further include a virtual private network (VPN) and/or a wide-area Ethernet (registered trademark). The network N is any one of a wired network, a wireless network, and a combination of the wired network and the wireless network. In a case where the electronic apparatus 10 or the authentication server apparatus 30 connects to the network N through a mobile phone network such as 3G, Long Term Evolution (LTE), 4G, the LAN can be omitted.

The electronic apparatus 10 is any suitable apparatus, provided that it can authenticate the user U with an IC card. It is assumed that he electronic apparatus 10 is used by a plurality of users U, who are not unspecified persons but qualified persons such as employees. In the present embodiment, examples of the electronic apparatus 10 include a multifunction peripheral, an electronic whiteboard, a projector, and a videoconference terminal. The multifunction peripheral usually has plural functions such as a printer function, a facsimile transmitting/receiving function, a document scanner function, and a copier function. However, in the present embodiment, the multifunction peripheral does not have to have plural functions. In other words, the multifunction peripheral can be an apparatus having one of a printer function, a scanner function, a facsimile function, and a copier function. In another example, the multifunction peripheral referred to as an MFP, a copier, an image forming apparatus, office equipment or the like.

In still another example, the electronic apparatus 10 is a personal computer (PC), a head-up display device, a video game machine, or the like. In still another example, the electronic apparatus is an apparatus used by an individual, if the apparatus has a function of authenticating the individual with an IC card.

The authentication server apparatus 30 is an information processing apparatus that authenticates the user U of the electronic apparatus 10. A server is an apparatus that provides data or a processing result in response to a request from a client device (electronic apparatus 10 in FIG. 2) that is connected to the server via a network. In the present embodiment, the authentication server apparatus 30 provides the electronic apparatus 10 with an authentication result of the user U.

The authentication server apparatus 30 is provided either in a company or outside a company. In an example of FIG. 2, the authentication server apparatus 30 is configured as a single apparatus. In another example, the authentication server apparatus 30 supports cloud computing. The term "cloud computing" refers to computing where resources on a network are used or accessed without identifying specific hardware resources.

<Hardware Configuration>
<<Authentication Server Apparatus 30>>

Figure 3:
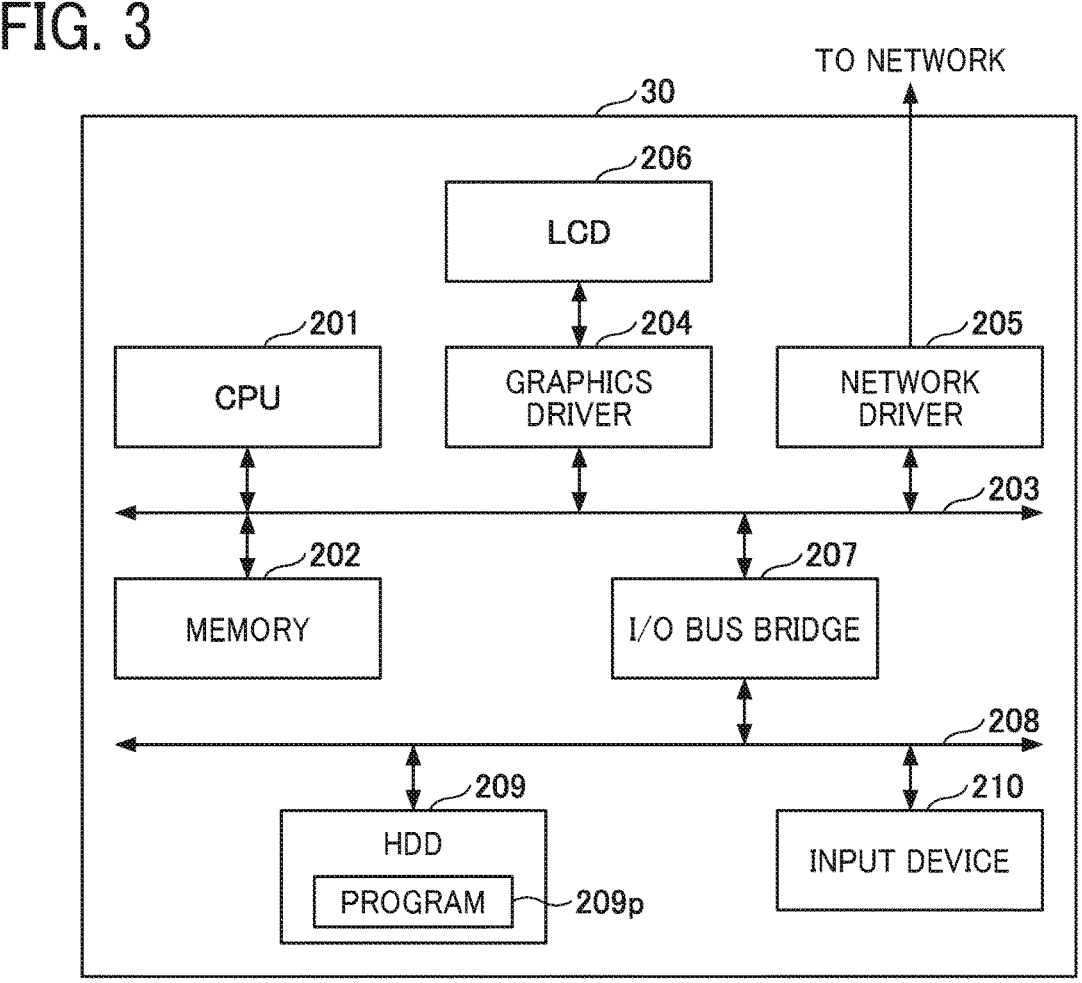
FIG. 3 is a block diagram illustrating an example of hardware configuration of an authentication server apparatus, according to an embodiment of the present disclosure.

FIG. 3 is a block diagram illustrating an example of hardware configuration of the authentication server apparatus 30. The authentication server apparatus 30 includes a central processing unit (CPU) 201 and a memory 202 that enables the CPU 201 to access data to be used at high speed. The CPU 201 and the memory 202 are connected to other devices or drivers of the authentication server apparatus 30, such as a graphics driver 204 and a network driver (NIC) 205, through a system bus 203.

The graphics driver 204 is connected to a liquid crystal display (LCD) 206 as an example of display device via a bus. The graphics driver 204 monitors a processing result of the CPU 201. Further, the network driver 205 connects the authentication server apparatus 30 to the network N at a transport layer level and a physical layer level to establish a session with the electronic apparatus 10.

Further, an input/output (I/O) bus bridge 207 is connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), Universal Serial Bus (USB), etc. The HDD 209 stores a program 209p for controlling entire operation of the authentication server apparatus 30. The HDD 209 is replaceable with a solid state drive (SSD).

An input device 210 such as a keyboard and a mouse (also referred to as a pointing device) is connected to the I/O bus 208 via a bus such as a USB. The input device 210 accepts inputs or instructions form an operator such as a system administrator.

The hardware configuration of the authentication server apparatus 30 is not necessarily housed in one housing nor provided as apparatus of one unit as illustrated in FIG. 3. In other words, the illustrated hardware configuration indicates hardware elements preferably included in the authentication server apparatus 30. In addition, in order to support cloud computing, a physical configuration of the authentication server apparatus 30 of the present embodiment does not have to be static. In other words, hardware resources can be dynamically connected/disconnected to constitute the authentication server apparatus 30.

<<Hardware Configuration of Electronic Apparatus 10>>

Figure 4:
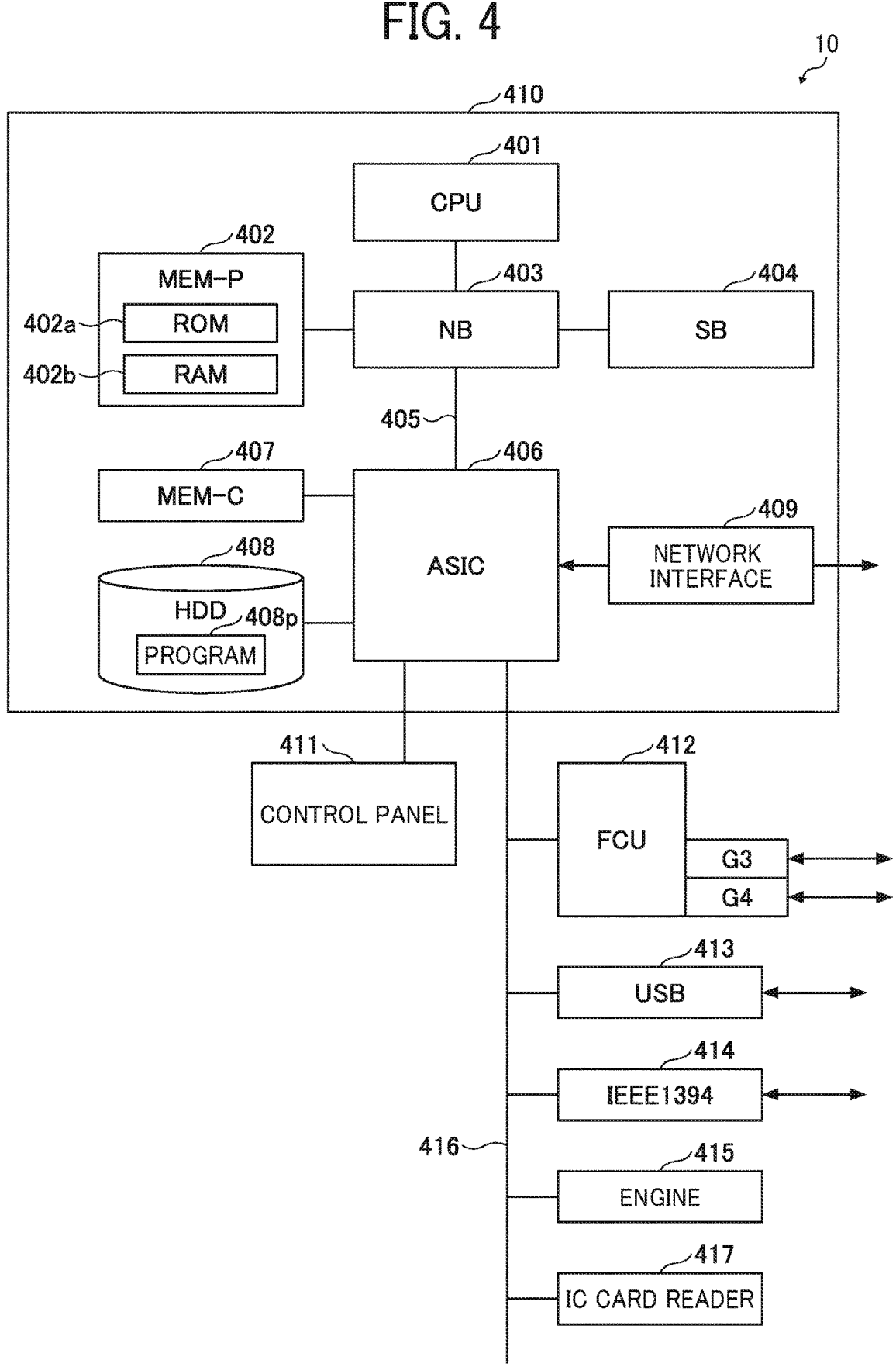
FIG. 4 is a block diagram illustrating an example of a hardware configuration of the electronic apparatus, according to an embodiment of the present disclosure.

FIG. 4 is a block diagram illustrating an example of a hardware configuration of the electronic apparatus 10. In the electronic apparatus 10, a facsimile control unit (FCU) 412, a USB 413, an Institute of Electrical and Electronics Engineers 1394 (IEEE 1394) interface 414, an engine 415, and an IC card reader 417 are connected to a controller 410 via a peripheral component interconnect (PCI) bus 416.

The controller 410 controls entire operation of the electronic apparatus 10, such as drawing and communicating, and also controls inputs from a control panel 411.

The engine 415 is, for example, a printer engine that is connectable to the PCI bus 416. Examples of engine 415 include a monochrome plotter, a single-drum color plotter, a four-drum color plotter, a scanner, and a facsimile unit.

The engine 415 also includes an image processing unit that performs image processing such as error diffusion and gamma conversion, in addition to an engine unit such as a plotter.

The controller 410 includes a CPU 401, a north bridge (NB) 403, a system memory (MEM-P) 402, a south bridge (SB) 404, a local memory (MEM-C) 407, an application specific integrated circuit (ASIC) 406, and an HDD 408. The NB 403 and the ASIC 406 are connected to each other through an accelerated graphics port (AGP) bus 405.

Further, the MEM-P 402 includes a read only memory (ROM) 402a and a random access memory (RAM) 402b.

The CPU 401 controls entire operation of the electronic apparatus 10. The CPU 401 is connected to another device via a chip set including the NB 403, the MEM-P 402, and the SB 404.

The NB 403 is a bridge that connects the CPU 401, the MEM-P 402, the SB 404, and the AGP bus 405 to one another. The NB 403 includes a memory controller that controls reading and writing data to and from the MEM-P 402, a PCI master, and an AGP target.

The MEM-P 402 is a system memory used as, for example, a memory to store programs or data, a memory to deploy programs or data, and a memory to store drawing data for printing. The MEM-P 402 includes a ROM 402a and a RAM 402b.

The ROM 402a is a read only memory used as a memory to store programs or data. The RAM 402b is a read-write memory used as, for example, a memory to deploy programs or data and a memory to store drawing data for printing.

The SB 404 is a bridge that connects the NB 403 to a PCI device and a peripheral device. The SB 404 is connected to the NB 403 via a PCI bus. A network interface 409, for example, is also connected to the PCI bus. The ASIC 406 is an integrated circuit (IC) dedicated to image processing that includes hardware elements for image processing. The ASIC 406 serves as a bridge that connects the AGP bus 405, the PCI bus 416, the HDD 408, and MEM-C 407 to one another.

The ASIC 406 includes a PCI target, an AGP master, an arbiter (ARB), which is a core of the ASIC 406, a memory controller that controls the MEM-C 407, a plurality of direct memory access controllers (DMACs) that performs rotation or the like of image data with a hardware logic, and a PCI unit that exchanges data with the engine 415 via the PCI bus.

The network interface 409 is a communication device that enables the electronic apparatus 10 to communicate with other devices such as the authentication server apparatus 30 via the network N. Examples of the network interface 409 include a network interface card (NIC).

The control panel 411 is directly connected to the ASIC 406.

The MEM-C 407 is a local memory, which is used as a buffer storing image data to be copied or a buffer storing data to be coded. The HDD 408 is a storage that stores image data, programs, font data, and forms.

The IC card reader 417 is a device that reads data stored in an IC card that exists within a range of radio waves, not requiring the IC card to be brought in contact with the IC card reader 417. In another example, the IC card reader 417 is a device that reads data stored in an IC card having a terminal on its surface, when the terminal is brought into contact the IC card reader 417. In still another example, the IC card reader 417 has a function of writing information to an IC card. In another example, a magnetic strip card is used instead of the IC card. In still another example, the IC card have both functions of an IC card and a magnetic stripe card. A magnetic strip card is a card having a band of magnetic material on the card. Data is stored in the card by modifying the magnetism of magnetic particles on the band. In a case where such a magnetic strip card is used, the IC card reader 417 reads data stored in the card when the card is brought into contact with the IC card reader 417. In still another example, a user manually enters information to be stored in the IC card. In this case, the IC card reader 417 is replaceable with a keyboard. In still another example, a mobile phone or a smartphone having a near-field communication (NFC) chip or the like is used instead of the IC card.

The HDD 408 stores a program 408p executed by the electronic apparatus 10.

The AGP bus 405 is a bus interface for a graphics accelerator card that is devised for accelerating graphic processing. The AGP bus 405 directly accesses the MEM-P 402 with high throughput to accelerate the graphics accelerator card.

The illustrated hardware configuration of the electronic apparatus 10 is just an example. In another example, the electronic apparatus 10 can be a device in which the control panel 411 is implemented by an information processing apparatus such as a tablet terminal. The hardware configuration can be different depending on the electronic apparatus 10.

<Functions>

Figure 5:
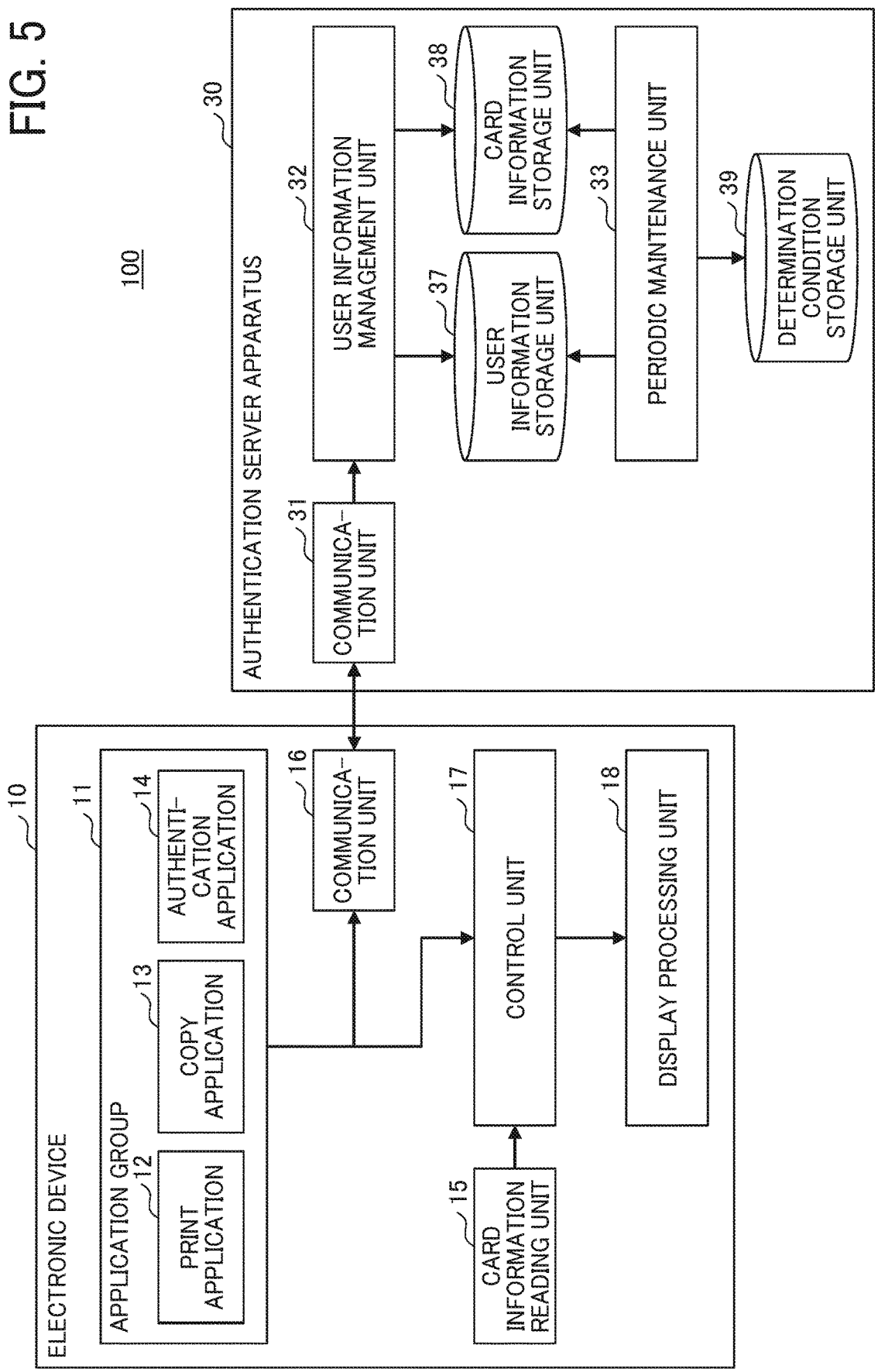
FIG. 5 is a block diagram illustrating an example of functional configurations of the electronic apparatus and the authentication server apparatus that the authentication system includes, according to an embodiment of the present disclosure.

FIG. 5 is a block diagram illustrating an example of functional configurations of the electronic apparatus 10 and the authentication server apparatus 30 that the authentication system 100 includes. In the drawing, functions of the electronic apparatus 10 and the authentication server apparatus 30 that are not relevant to the description of the present embodiment are omitted.

<<Electronic Apparatus 10>>

The electronic apparatus 10 includes an application group 11, a card information reading unit 15, a communication unit 16, a control unit 17, and a display processing unit 18. These functions of the electronic apparatus 10 are functions or means implemented by operating one or more hardware elements illustrated in FIG. 4 in cooperation with instructions of the CPU 401 according to the program 408p loaded from the HDD 408 onto the RAM 402b. In one example, the program 408p is distributed from a server for program distribution. In another example, the program 408p is distributed as being stored in a portable storage medium such as a USB memory or an optical storage medium.

The application group 11 is one or more applications installed in the electronic apparatus 10. The application group 11 includes a print application 12, a copy application 13, and an authentication application 14 corresponding to functions of the electronic apparatus 10. These applications 12, 13 and 14 of the application group 11 are invoked in response to corresponding keys of the electronic apparatus 10 being pressed by the user U. When invoked, each of the applications 12, 13 and 14 generates a user interface having items of functions to which settings is to be configured or settings can be configured. The display processing unit 18 displays the user interface on the control panel 411 as a screen of each of the applications 12, 13 and 14.

Each of the applications 12, 13 and 14 causes the electronic apparatus 10 to perform printing, copying, authentication, etc. through an application interface (API) that invokes functions of the electronic apparatus 10. For example, the authentication application 14 displays a lock screen for accepting authentication on the control panel 411 until authentication is established. When authentication is established, the authentication application 14 permits display of screens of other applications.

The card information reading unit 15, which is implemented by the IC card reader 417 described above, reads card information from an IC card that is brought close to within a predetermined distance from the IC card reader 417. The card information is the whole or a part of information stored in the IC card. As described above, in another example, the information stored in the IC card is input with a magnetic strip card or manually by a user. The card information stored in the IC card varies depending on the IC card. Examples of the card information include a personal identification number (PIN) number, a card ID, a user ID, a user name, and a password. The PIN number is identification information of an IC card whose uniqueness is guaranteed. The PIN number can be used as the card ID or the user ID. In addition to those items of information, a variety of information can be stored in the IC card.

The communication unit 16 exchanges various types of information with the authentication server apparatus 30 via the network N. In the present embodiment, the communication unit 16 transmits the card information to the authentication server apparatus 30, and receives an authentication result from the authentication server apparatus 30.

The control unit 17 is a device that controls entire operation of the electronic apparatus 10. The control unit 17 executes processing necessary for authentication of the user U in response to a request from the authentication application 14. Specifically, the control unit 17 causes the card information reading unit 15 to read the card information stored in the IC card, causes the communication unit 16 to transmit the card information, and sends an authentication result received from the authentication server apparatus 30 to the authentication application 14. When authentication is established, the authentication application 14 requests the control unit 17 to display a screen corresponding to the authentication result. In response to this request form the authentication application 14, the control unit 17 requests the display processing unit 18 to display the authentication result.

The display processing unit 18 displays various screens on the control panel 411. For example, the display processing unit 18 displays a screen as the user interface generated by the application group 11.

<<Authentication Server Apparatus 30>>

The authentication server apparatus 30 includes a communication unit 31, a user information management unit 32, and a periodic maintenance unit 33. These functions of the authentication server apparatus 30 are functions or means implemented by operating one or more hardware elements illustrated in FIG. 3 in cooperation with instructions of the CPU 201 according to the program 209p loaded from the HDD 209 onto the memory 202. In one example, the program 209p is distributed from a server for program distribution. In another example, the program 209p is distributed as being stored in a portable storage medium such as a USB memory or an optical storage medium.

The authentication server apparatus 30 further includes a user information storage unit 37, a card information storage unit 38, and a determination condition storage unit 39, which are implemented by the HDD 209 or the memory 202 illustrated in FIG. 3. Hereinafter, a description is given of each of these databases.

TABLE 1

| User Name | Password |
|---|---|
| tanaka | **** |
| yamashita | **** |
| yamada | **** |
| saitoh | **** |

Table 1 schematically illustrates an example of user information stored in the user information storage unit 37. Information on the user U is stored in the user information storage unit 37. In an example of Table 1, the user information storage unit 37 has a user name and a password as items. The user name is a name using which the user U or an administrator identify the user U in the authentication server apparatus 30. The password is information that is kept secret to authenticate the user U.

TABLE 2

| Card ID | Owner User Name | Last Login Date and Time |
|---|---|---|
| 123001 | tanaka | 9/30 5:00:00 pm |
| 123002 | tanaka | 10/30 6:00:00 pm |
| 123003 | yamada | 10/29 7:00:00 pm |
| 555004 | yamada | 10/31 7:30:00 pm |
| 555005 | saitoh | 11/1 2:00:00 pm |
| 678006 | saitoh | 11/1 3:00:00 pm |

Table 2 schematically illustrates an example of card management information stored in the card information storage unit 38. The card management information includes at least a part of the information stored in the IC card and information to be stored in association with the information stored in the IC card. In other words, the whole or a part of the card management information is overlapped with the card information stored in the IC card. The card management information is an example of card-related information associated with identification information of the card.

In the card information storage unit 38, a card ID, an owner user name, and a last login date and time are stored as items. The card ID is identification information for uniquely identifying or specifying an IC card. For example, the above-described PIN number is used as the card ID. The owner user name is a user name of the user U who owns the IC card. The last login date and time is a date and time when the user U logged in to the electronic apparatus 10 most recently. In the embodiment, "login" refers to an authentication process of determining whether a user has authorization to access functions of the electronic apparatus 10 or data of an individual using account information (e.g., the card ID, user name, password, etc.) registered in advance, when the user is going to use services provided by the electronic apparatus 10. The "login" is also referred to as logon or sign-in. The user can log in to the electronic apparatus 10 when authentication by the authentication server apparatus 30 is established. In the present embodiment, a description is given assuming that a date and time when the authentication of the user U by the authentication server apparatus 30 is most recently established is the last login date and time.

As can be seen from Table 2, a specific user U is associated with one or more IC cards based on the owner user name and the card ID of the card information storage unit 38.

TABLE 3

| Item Name | Setting Value |
|---|---|
| Storage Period | 30 (days) |

Table 3 schematically illustrates an example of information stored in the determination condition storage unit 39. In the determination condition storage unit 39, a storage period is registered during which the card management information stored in the card information storage unit 38 is not to be deleted. In other words, the storage period is a period after which the card management information stored in the card information storage unit 38 is deleted. In Table 3, the storage period is set to 30 days. This is just an example, and an administrator can set the storage period to a desired period. In another example, the user U sets the storage period to a desired period.

Referring again to FIG. 5, the user information management unit 32 receives an authentication request of the user U from the electronic apparatus 10 and performs processing relating to user authentication referring to the user information storage unit 37 or the card information storage unit 38. More specifically, in a case where a user enters his or her user name and password, the user information management unit 32 refers to the user information storage unit 37. In a case where the user causes the IC card to be read, the user information management unit 32 refers to the card information storage unit 38. In the present embodiment, a description is given of an example case where the card information storage unit 38 is referenced. Further, the user information management unit 32 updates the last login date and time stored in the card information storage unit 38.

In another example, as for the authentication of the user U, further authentication is performed by connecting to an external directory server such as the Active Directory server.

The periodic maintenance unit 33 deletes, from the card information storage unit 38, a record of the card management information for which the storage period stored in the determination condition storage unit 39 has elapsed since the last login date and time. This deletion is performed at regular intervals or at a desired timing. In the embodiment, deletion of the old card management information at a predetermined timing is referred to as maintenance of card management information.

<Operations>

Figure 6:
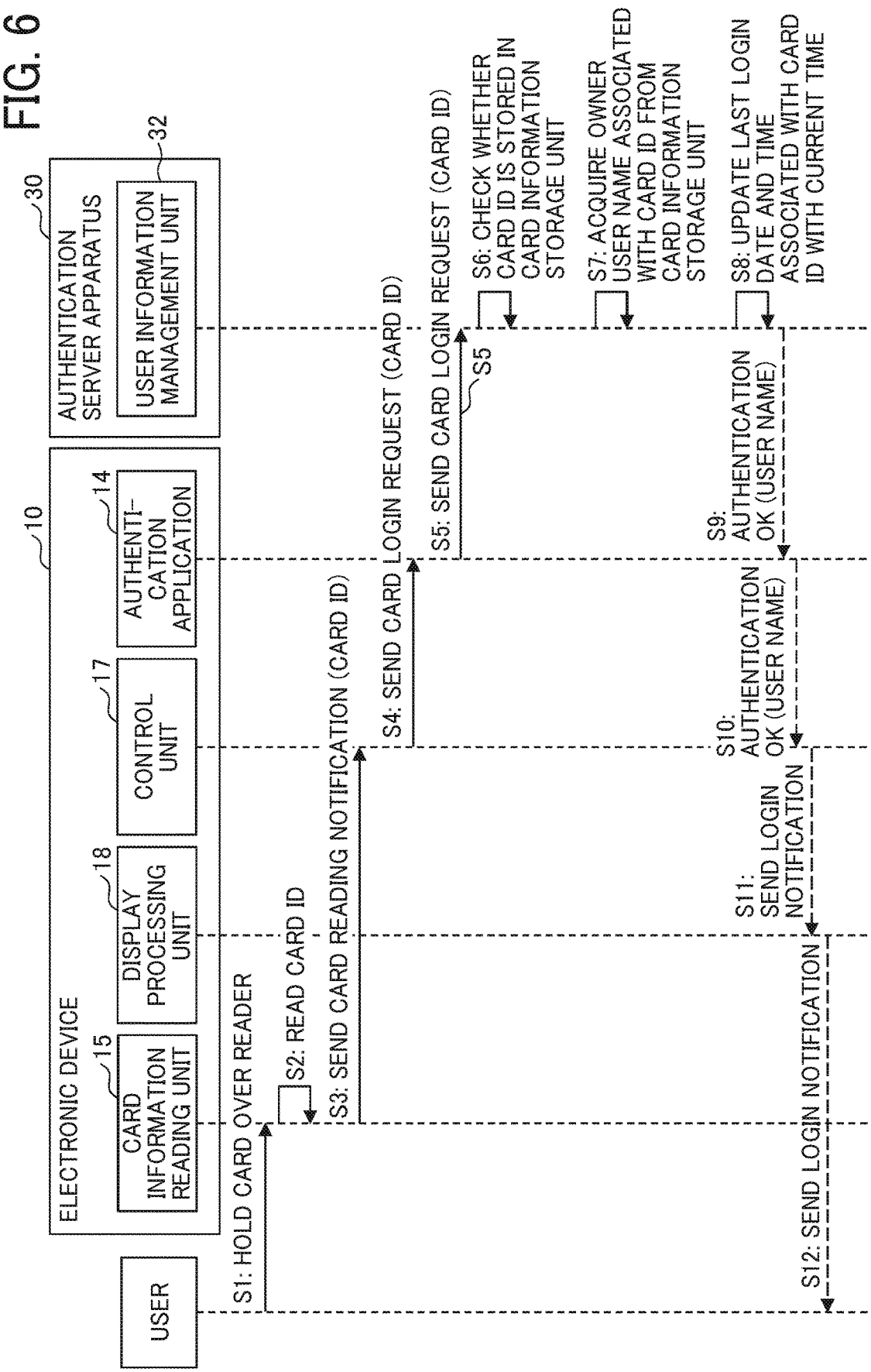
FIG. 6 is a sequence diagram illustrating an example of a process of authenticating a user by the authentication system, according to an embodiment of the present disclosure.

FIG. 6 is a sequence diagram illustrating an example of a process of authenticating the user U by the authentication system 100. The process illustrated in FIG. 6 starts when the user U starts an operation for authenticating in a state where the authentication application 14 is displaying the lock screen. A description is given assuming that on the lock screen, the electronic apparatus 10 waits for an IC card being brought close to the electronic apparatus 10.

S1: First, the user U holds an IC card that the user U is carrying with himself or herself over the IC card reader 417.

S2: The card information reading unit 15 reads a card ID stored in the IC card. In another example, the card information reading unit 15 read other information in addition to the card ID.

S3: The card information reading unit 15 sends a card reading notification to the control unit 17. This card reading notification includes the card ID that is read in step S2.

S4: The control unit 17 sends a card login request including the card ID to the authentication application 14.

S5: The authentication application 14 transmits the card login request to the user information management unit 32 of the authentication server apparatus 30 via the communication unit 16. In FIG. 6, the communication unit 16 of the electronic apparatus 10 and the communication unit 31 of the authentication server apparatus 30 are omitted, in order to simplify the description.

S6: The communication unit 31 of the authentication server apparatus 30 receives the card login request and sends the received card login request to the user information management unit 32. The user information management unit 32 determines whether the card ID included in the card login request transmitted from the electronic apparatus 10 is stored in the card information storage unit 38. In the description of FIG. 6, it is assumed that the card ID is stored in the card information storage unit 38. As a result, the user information management unit 32 determines that the authentication is successful. By contrast, when the card ID is not stored in the card information storage unit 38, the user information management unit 32 determines that the authentication has failed.

In the process sequence of FIG. 6, the authentication is successful when the card ID read by the electronic apparatus 10 is stored in the card information storage unit 38. In other words, the authentication successful, when the IC card the user U owns is stored is registered in the card information storage unit 38. In another example, a password stored in the user information storage unit 37 is further checked.

S7: Next, the user information management unit 32 acquires an owner user name associated with the card ID from the card information storage unit 38.

S8: Next, the user information management unit 32 updates a last login date and time associated the card ID to the current date and time.

S9: The user information management unit 32 of the authentication server apparatus 30 transmits a notification indicating that the authentication is successful to the electronic apparatus 10 via the communication unit 31. This notification includes the user name acquired in step S7.

S10: The authentication application 14 of the electronic apparatus 10 receives the notification indicating that the authentication is successful via the communication unit 16, and sends the notification indicating that the authentication is successful to the control unit 17.

S11: The control unit 17 sends a login notification to the display processing unit 18.

S12: The display processing unit 18 notifies the user U that the login has been completed by, for example, displaying on a part of the screen information indicating that the login has been successful. For example, the display processing unit 18 displays the user name on the part of the screen. With the process described above, the user U can use the electronic apparatus 10.

By contrast, in a case where the authentication has failed, the user U cannot use the electronic apparatus 10. In this case, for example, the lock screen is not unlocked. This enables to prevent the user U who does not have a registered IC card or the user U whose IC card is not registered in the authentication server apparatus 30 from using the electronic apparatus 10.

<Delete Old IC Card>

Figure 7:
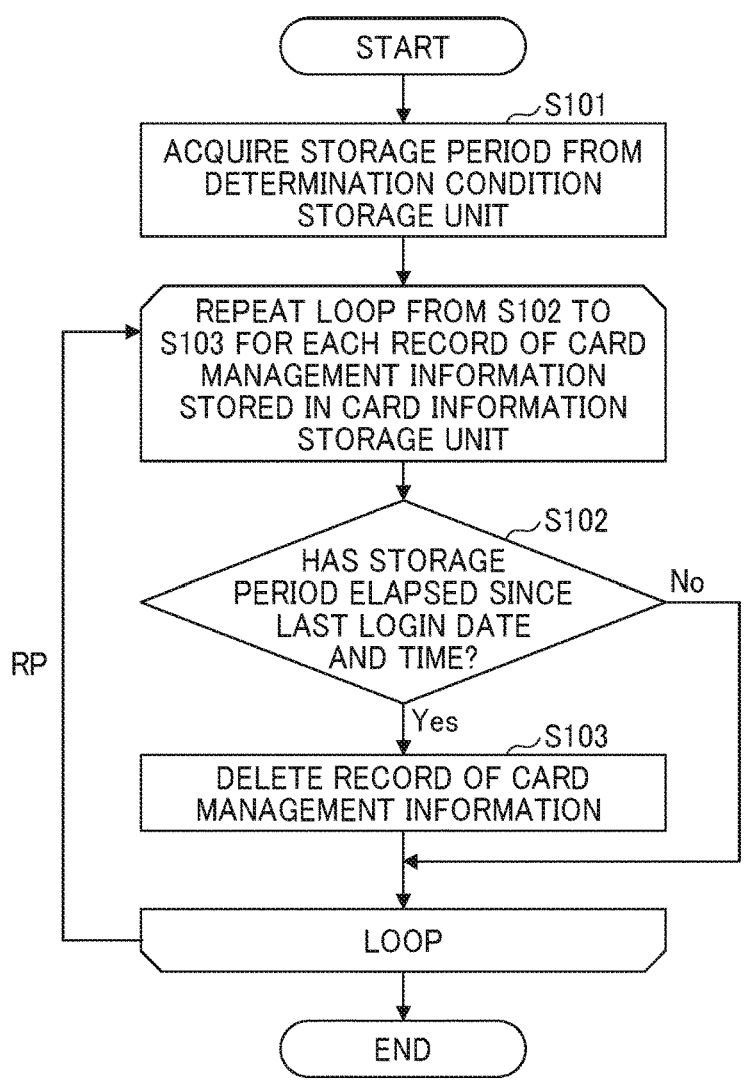
FIG. 7 is a flowchart illustrating an example of a process of periodically deleting one or more records of card management information in a card information storage unit by a periodic maintenance unit, according to an embodiment of the present disclosure.

FIG. 7 is a flowchart illustrating an example of a process of periodically deleting one or more records of the card management information in the card information storage unit 38 by the periodic maintenance unit 33. The process of FIG. 7 is executed at a fixed timing such as once a half day, once a day, once a week, and once a month.

First, the periodic maintenance unit 33 acquires the storage period from the determination condition storage unit 39 (S101).

Next, the periodic maintenance unit 33 repeats a loop process from step S102 to step S103 on all records of the card management information stored in the card information storage unit 38.

In step S102, the periodic maintenance unit 33 determines whether the storage period has elapsed since the last login date and time of a target record (S102).

When the determination result indicates that the storage period has elapsed since the last login date and time of the target record (S102: YES), the periodic maintenance unit 33 determines that the target record of the card management information is old and deletes the target record of the card management information (S103).

With the process described above, one or more records of the card management information including old last login date and time are deleted. Therefore, maintenance of the card information storage unit 38 is implemented by performing the process periodically by the periodic maintenance unit 33.

The maintenance process is not necessarily performed periodically. In another example, the maintenance process is performed at the timing when the administrator instructs "execution of deletion". This enables to perform the maintenance of the card management information at a desired timing such as when the administrator wants to reduce a data size of the card management information. In still another example, the maintenance process is performed each time the authentication server apparatus 30 receives the authentication request using the IC card. This enables to perform the maintenance of the card management information at a timing when the user information management unit 32 accesses the card information storage unit 38.

On the other hand, in a case where the maintenance process is performed at regular intervals, instructions by the administrator or the user U are unnecessary. Accordingly, convenience is enhanced compared with when the administrator or the user U instructs maintenance.

<Registration of Storage Period>

The different users U or different companies have different determination conditions as to how old record of the card management information is to be deleted. For this reason, it is preferable that the administrator can set the storage period to a desired period. When the administrator logs in to the electronic apparatus 10, the administrator can set the storage period using authorization assigned to the administrator. The authentication application 14 causes the display processing unit 18 to display on the control panel 411 a screen for setting the storage period according to an operation by the administrator.

Figure 8:
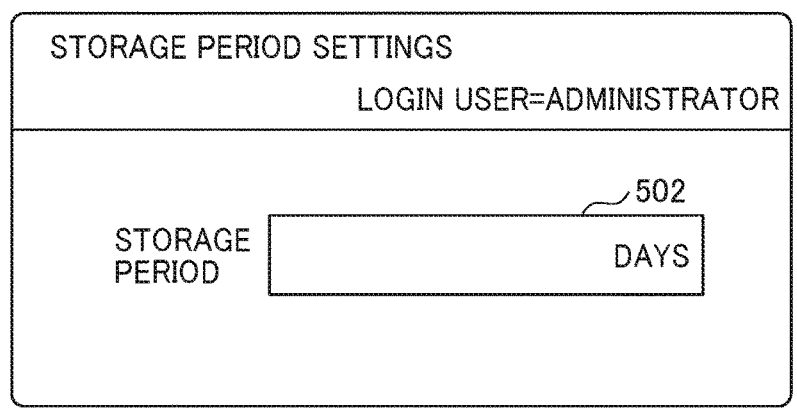
FIG. 8 is a diagram illustrating an example of a storage period setting screen displayed on a control panel, according to an embodiment of the present disclosure.

FIG. 8 is a diagram illustrating an example of a storage period setting screen 501 displayed on the control panel 411. The storage period setting screen 501 has a storage period setting field 502. The administrator sets a storage period in the storage period setting field 502. In FIG. 8, an example is illustrated in which a unit of the storage period is "day". In another example, the unit of the storage period can be "week", "month" or "year".

In still another example, the administrator can set different storage periods for different users U. In this case, on the storage period setting screen 501, the storage period setting field 502 is displayed in association with each user name. The electronic apparatus 10 acquires the user name from the authentication server apparatus 30 and displays the acquired user name together with the storage period setting field 502. This enables to change a storage period of the card management information depending on the user U. In still another example, the storage period is set for some of plural users collectively, such as for each of authorizations assigned to the users or for each of divisions to which the users belong to.

The storage period set by the administrator is transmitted to the authentication server apparatus 30 and stored in the determination condition storage unit 39.

As described above, the authentication system 100 according to the present embodiment automatically deletes an old record of the card management information. This enables to delete the card management information of an IC card that is not being used, saving the administrator or the user U from having to specify the IC card whose card management information is to be deleted. Therefore, even when the user U owns a plurality of IC cards or when an IC card that the user U owns is changed, information relating to the old IC card is prevented from continuing to remain in the authentication server apparatus 30.

Second Embodiment

The authentication system 100 according to the first embodiment deletes an old record of the card management information. However, in a case where the user U owns only one IC card, he or she cannot log in to the electronic apparatus 10 if a corresponding record of the card management information is deleted.

To address this issue, in the present embodiment, a description is given of the authentication system 100 that deletes card management information when a user possesses a plurality of IC cards. Specifically, in a case where there is a record of card management information including a last login date and time from which the storage period has elapsed, the authentication system 100 deletes the record of the card management information only when there are one or more records of login that has been performed after the last login date and time using one or more other IC cards owned by the user U.

For example, in a case where, from among a plurality of IC cards owned by a certain user, there are one IC card for which a predetermined period or more has not elapsed since a last login date and time at a maintenance time and the other IC card for which the predetermined time or more has elapsed since the last login date and time, the authentication system 100 deletes the card management information of the IC card for which the predetermined period or more has elapsed since the last login date and time.

In this embodiment, the authentication server apparatus 30 and the electronic apparatus 10 have the same or substantially the same hardware configurations as those illustrated in FIG. 3 and FIG. 4, respectively. Even if either one or both of the authentication server apparatus 30 and the electronic apparatus 10 have a different hardware configuration, a description of the present embodiment is given under the assumption that such differences are insignificant. Further, the authentication server apparatus 30 and the electronic apparatus 10 have the same or substantially the same functional configuration as those illustrated in FIG. 5. Even if at least one of the authentication server apparatus 30 and the electronic apparatus 10 has a different functional configuration, a description of the present embodiment is given under the assumption that such differences are insignificant.

<Operations>

Figure 9:
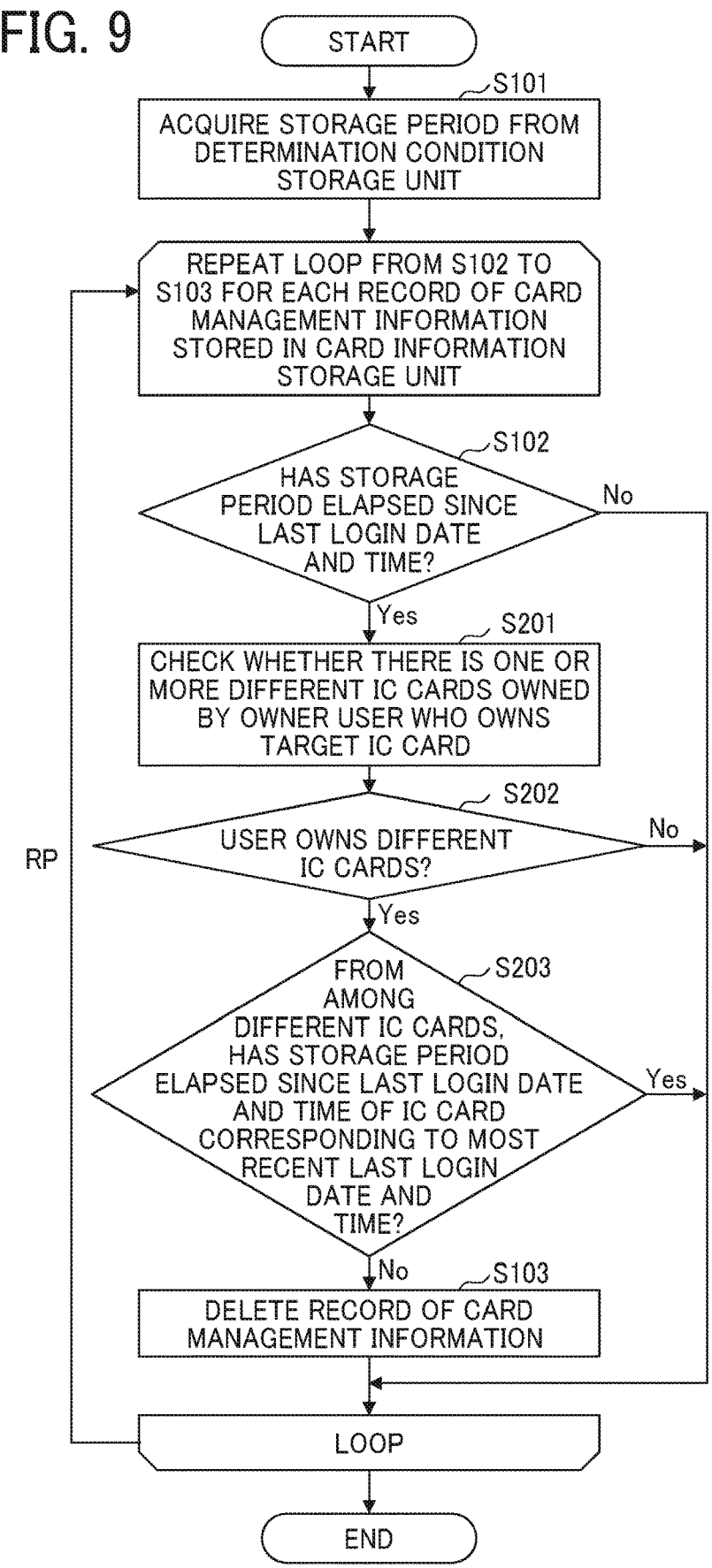
FIG. 9 is a flowchart illustrating an example of a process of periodically deleting one or more records of the card management information in the card information storage unit by the periodic maintenance unit, according to another embodiment of the present disclosure.

FIG. 9 is a flowchart illustrating another example of a process of periodically deleting one or more records of the card management information in the card information storage unit 38 by the periodic maintenance unit 33. In the following description of FIG. 9, differences from FIG. 7 are described. The process from steps S101 to S102 is the same or substantially the same as that of FIG. 7.

When the determination result of step S102 indicates that the storage period has elapsed since the last login date and time of a target record (S102: YES), the periodic maintenance unit 33 checks whether an owner of the IC card for which the storage period has elapsed since the last login date and time owns one or more other IC card (S201). In other words, even when there is a record of card management information for which the storage period has elapsed since the last login date and time, the periodic maintenance unit 33 does not delete the record immediately. Specifically, the periodic maintenance unit 33 refers to the card management information and checks whether there is a plurality of records of card management information including the same owner user name as an owner user name of the IC card for which the storage period has elapsed since the last login date and time.

When the owner of the IC card for which the storage period has elapsed since the last login date and time does not own another IC card (S202: NO), a next record of the card management information is processed. In other words, in a case where the user U owns only one IC card, the record of the card management information is not deleted even when the storage period has elapsed since the last login date and time.

In a case where the owner of the IC card for which the storage period has elapsed since the last login date and time owns one or more other IC cards (S202: YES), the periodic maintenance unit 33 determines whether the storage period has elapsed since a last login date and time of an IC card corresponding to the most recent last login date and time from among the one or more other IC cards (S203).

When the determination result indicates that the storage period has not elapsed since the last login date and time of the IC card associated with the most recent last login date and time from among the one or more other IC cards (S203: NO), the periodic maintenance unit 33 determines that the user U is no longer using the IC card as a current processing target (the IC card for which the determination result in step S102 indicates that the storage period has elapsed since the last login date and time). Accordingly, the periodic maintenance unit 33 deletes a record of the card management information of the IC card for which the determination result in step S102 indicates that the storage period has elapsed since the last login date and time (S103).

By contrast, when the determination result indicates that the storage period has elapsed since the last login date and time for each of the one or more other IC cards (S203: YES), the periodic maintenance unit 33 determines that the user U is in a situation where he or she is not using the electronic apparatus 10 or cannot use the electronic apparatus 10. Accordingly, the periodic maintenance unit 33 does not delete the target record of the card management information. With the process as described above, a record of the card management information of an IC card is prevented from being deleted by periodic processing, in a case where there is a user U who cannot use the electronic apparatus 10 for a long time.

<Summary of Embodiment>

The authentication system 100 according to the present embodiment can prevent a record of the card management information from being deleted, in a case where the user U owns only one IC card. Accordingly, a user is not prevented from logging into the electronic apparatus 10 even in a case where the user U has not log into the electronic apparatus 10 for a while. Further, for example, when the user U owns two IC cards and the storage period has passed since the last login date and time for both of the two IC cards, the periodic maintenance unit 33 does not delete the records of the card management information. Accordingly, in a situation where the user U is not using the electronic apparatus 10 or cannot use the electronic apparatus 10, the records of the card management information are kept stored. In addition, when the user owns a plurality of IC cards and no longer uses one or more of the IC cards, a record of the card management information corresponding to the IC card(s) which is no longer used is deleted.

Third Embodiment

Some users U are permitted to own a plurality of IC cards for business. In this case, if a record of the card management information corresponding to an IC card of which last login date and time is old is deleted as in the second embodiment, a user U cannot log into the electronic apparatus 10 using some of his or her own IC cards. Therefore, records of the card management information should not be deleted for the number of IC cards that the user U is permitted to own.

In the present embodiment, a description is given of the authentication system 100 that, in a case where the user U owns a larger number of IC cards than the number of IC cards that the user U is permitted to own, deletes one or more records of the card management information in ascending chronological order of the last login date and time, within a range that exceeds the number of IC cards that the user U is permitted to own.

In this embodiment, the authentication server apparatus 30 and the electronic apparatus 10 have the same or substantially the same hardware configurations as those illustrated in FIG. 3 and FIG. 4, respectively. Even if either one or both of the authentication server apparatus 30 and the electronic apparatus 10 have a different hardware configuration, a description of the present embodiment is given under the assumption that such differences are insignificant. As to the functional configuration of the electronic apparatus 10 and the authentication server apparatus 30 according to the present embodiment, differences from that of FIG. 5 are described. In the present embodiment, the user information stored in the user information storage unit 37 is different from Table 1 of the first embodiment.

TABLE 4

| User Name | Password | Number of Possessable Cards |
|---|---|---|
| tanaka | **** | 1 |
| yamashita | **** | 1 |
| yamada | **** | 2 |
| saitoh | **** | 1 |

Table 4 schematically illustrates an example of user information stored in the user information storage unit 37, according to the third embodiment. In the following description of Table 4, differences from Table 1 are described. In addition to the items in Table 1, the user information in Table 4 includes an item of the number of possessable cards. The number of possessable cards is an upper limit of the number of cards that each user U can own. An administrator or the like sets a value for each user to change the number of possessable for each user U. In a case where the user U uses a larger number of IC cards than the number of possessable cards, the authentication server apparatus 30 deletes one or more records of the card management information of IC cards in ascending chronological order of the last login date and time within a range that exceeds the number of possessable cards.

<Operations>

Figure 10B:
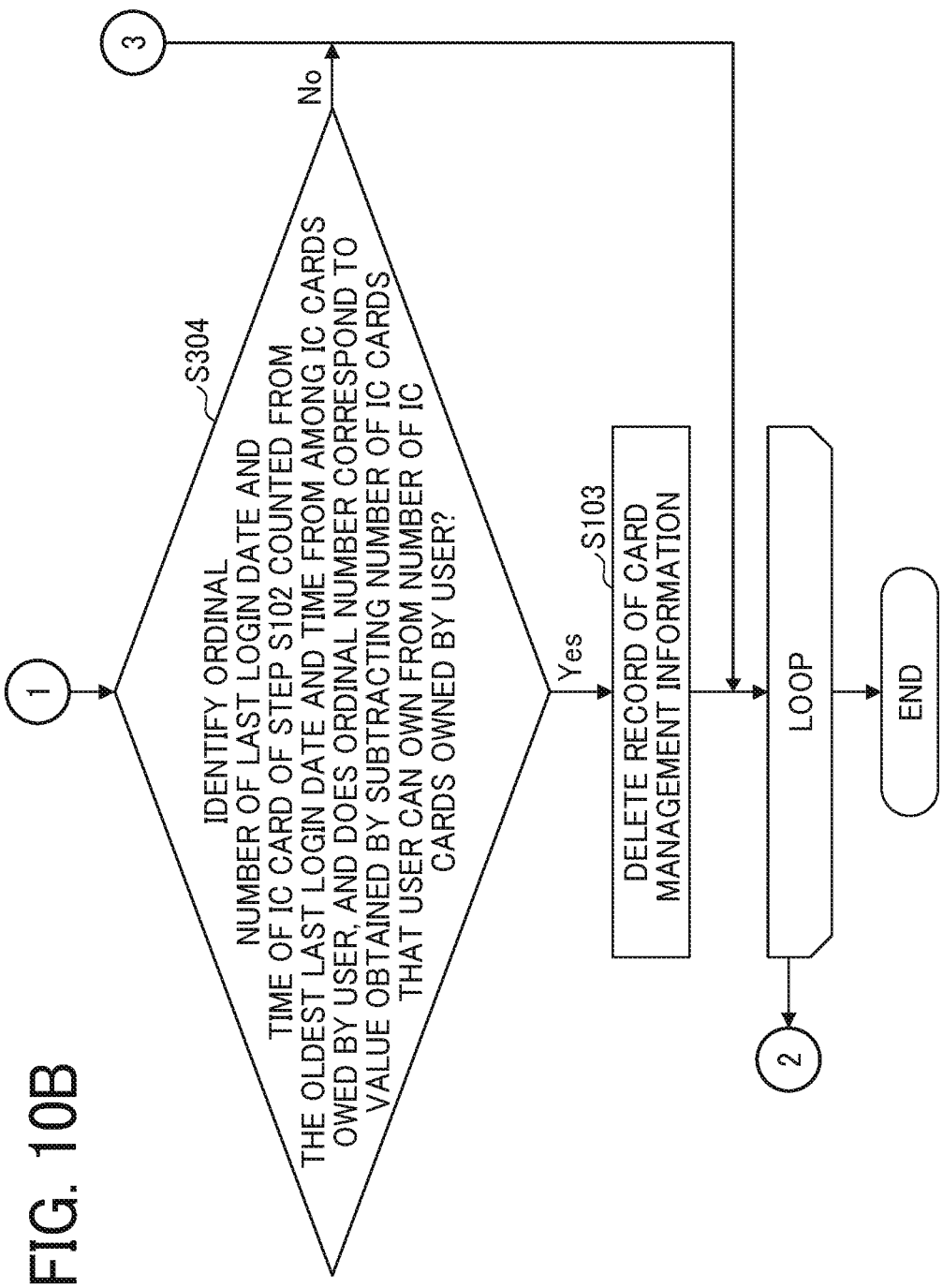

FIGS. 10A and 10B (FIG. 10) are a flowchart illustrating still another example of a process of periodically deleting one or more records of the card management information in the card information storage unit 38 by the periodic maintenance unit 33. In the following description of FIGS. 10A and 10B, differences from FIG. 7 are described. The process from steps S101 to S102 is the same or substantially the same as that of FIG. 7.

When the determination result of step S102 indicates that the storage period has elapsed since the last login date and time of a target record (S102: YES), the periodic maintenance unit 33 acquires from the user information storage unit 37 the number of possessable cards of a user U who owns the IC card for which the storage period has elapsed since the last login date and time (S301). Specifically, the periodic maintenance unit 33 acquires, from the card information storage unit 38, an owner user name of a user U who owns the IC card for which the storage period has elapsed since the last login date and time. Further, the periodic maintenance unit 33 acquires, from the user information storage unit 37, the number of possessable cards of the user U corresponding to the acquired owner user name.

Next, the periodic maintenance unit 33 searches the card information storage unit 38 to count the number of IC cards owned by the user U who owns the IC card for which the storage period has elapsed since the last login date and time (S302). This counting is performed in the same or substantially the same manner as step S201 of FIG. 9.

Then, the periodic maintenance unit 33 determines whether the number of IC cards owned by the user U counted in step S302 exceeds the number of possessable cards acquired in step S301 (S303). The number of cards owned by the user U counted in step S302 is an example of a first number of cards. The number of possessable cards acquired in step S301 is an example of a second number of cards.

When the determination result indicates that the number of IC cards owned by the user U does not exceed the number of possessable cards (S303: NO), it means that the user U is using IC cards within a permitted range. Accordingly, the periodic maintenance unit 33 ends the loop processing, and starts the loop processing on a next record of the card management information.

When the determination result indicates that the number of IC cards owned by the user U exceeds the number of possessable cards (S303: YES), the periodic maintenance unit 33 identifies an ordinal number of the IC card for which the storage period has elapsed since the last login date and time, which is counted from the oldest IC cards from among all the IC cards owned by the user U. Further the periodic maintenance unit 33 determines whether the ordinal number corresponds to a numerical value obtained by subtracting the number of possessable cards from the number of IC cards actually owned by the user U (S304). For example, in a case where the number of IC cards owned by the user U is larger than the number of possessable cards by one, the periodic maintenance unit 33 determines whether the IC card for which the determination result in step S102 indicates that the storage period has elapsed since the last login date and time is the oldest IC card (whether the ordinal number counted from the oldest IC card does not exceed one). Further, in a case where the number of IC cards owned by the user U is larger than the number of possessable cards by two, the periodic maintenance unit 33 determines whether the IC card corresponding to the target record is one of the oldest IC card or the second oldest IC card (whether the ordinal number counted from the oldest IC card is equal to or less than two.)

When the determination result in step S304 indicates that the ordinal number corresponds to a number of IC cards exceeding the number of possessable cards (S304: YES), the periodic maintenance unit 33 deletes the record of the card management information corresponding to the IC card for which the determination result in step S102 indicates that the storage period has passed since the last login date and time (S103).

As described above, when the number of IC cards used by the user U for login exceeds the number of possessable cards, the authentication server apparatus 30 according to the present embodiment, deletes one or more records of the card management information of the IC card in ascending chronological order of the last login date and time within a range of the number of IC cards exceeding the number of possessable cards.

Variation:

The above-described embodiment is illustrative and do not limit the present disclosure. Thus, numerous additional modifications and variations are possible in light of the above teachings within the scope of the present disclosure. Any one of the above-described operations may be performed in various other ways, for example, in an order different from the one described above.

<<Delete Card Management Information by Electronic Apparatus 10>>

In the first to third embodiments, the authentication system 100 including the electronic apparatus 10 and the authentication server apparatus 30 deletes the card management information. In another example, in a case where a main unit of the electronic apparatus 10 includes the card information storage unit 38, the processes described above in the first to third embodiments can also be implemented by the electronic apparatus 10 itself.

Figure 11:
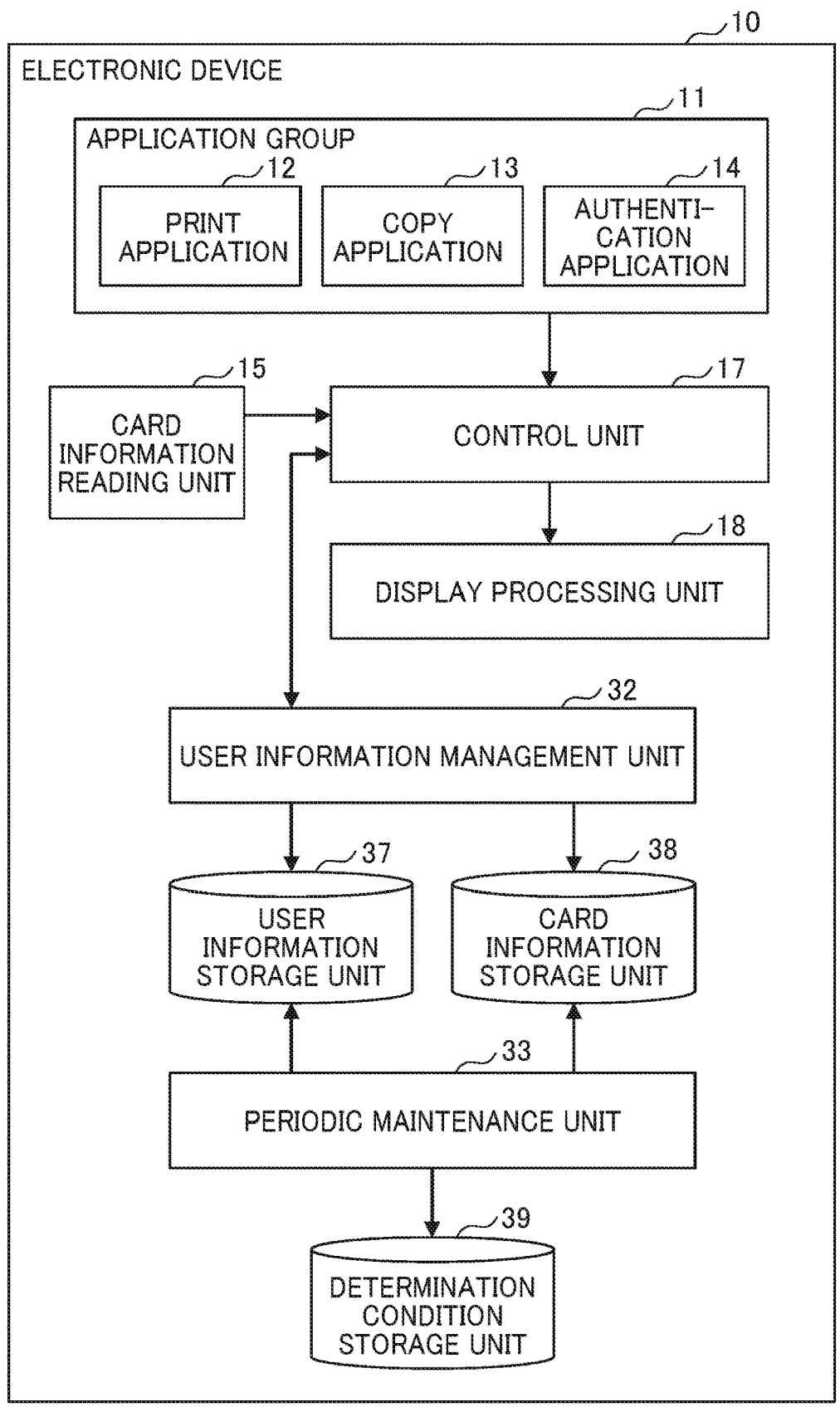
FIG. 11 is a block diagram illustrating an example of a functional configuration of the electronic apparatus including the card information storage unit, according to an embodiment of the present disclosure.

FIG. 11 is a block diagram illustrating an example of a functional configuration of the electronic apparatus 10 including the card information storage unit 38. In the electronic apparatus 10 of FIG. 11, the electronic apparatus 10 has the functions of the authentication server apparatus 30 of FIG. 5. Since communication between the electronic apparatus 10 and the authentication server apparatus 30 is unnecessary, the communication unit 16 and the communication unit 31 are not required. The electronic apparatus 10 of FIG. 11 further includes functions of the electronic apparatus 10 as illustrated in FIG. 5.

With the configuration as illustrated in FIG. 11, the electronic apparatus 10 not only authenticates the user U but also deletes an old record of the card management information automatically by itself.

<<User Authentication When Entering or Leaving Room, etc.>>

In the first to third embodiments, a description is given of an example in which an IC card is used when a user U uses the electronic apparatus 10. However, there are cases where the user U uses an IC card when entering a building or a room.

Figure 12:
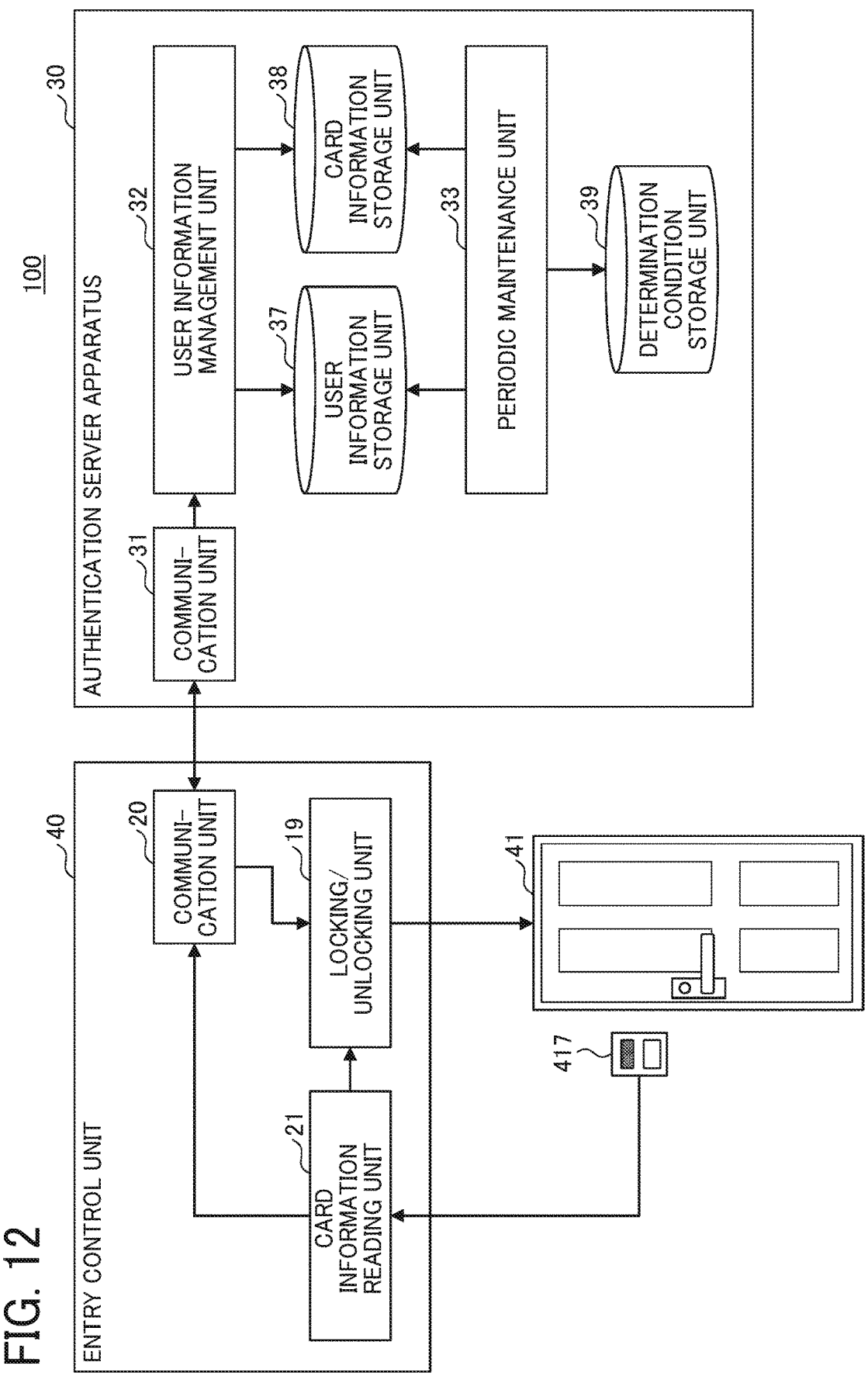
FIG. 12 is a schematic diagram illustrating an example of a system configuration of the authentication system that authenticates a user when the user enters a room, a building or the like, according to an embodiment of the present disclosure.

FIG. 12 is a schematic diagram illustrating an example of a system configuration of the authentication system 100 that authenticates a user U when the user U enters a room, a building or the like. As illustrated in FIG. 12, the IC card reader 417 is provided near a door 41. The IC card reader 417 is connected to an entry control unit 40 wirelessly or by wire.

The entry control unit 40 is implemented by an information processing apparatus such as a microcomputer. The entry control unit 40 and the IC card reader 417 is fixed to or embedded in a wall as one unit.

The entry control unit 40 include the card information reading unit 15, the communication unit 16, and a locking/unlocking unit 19. The functions of the card information reading unit 15 and the communication unit 16 are the same or substantially the same as those described referring to FIG. 5. The locking/unlocking unit 19 is connected to a lock mechanism of the door 41 wirelessly or by wire, and locks or unlocks the door 41. In one example, the door 41 is unlocked with a motor. In another example, a user U unlocks the door 41 after the door 41 receives a keylock signal. The authentication server apparatus 30 has the same or substantially the same configuration as that of FIG. 5.

With the configuration as illustrated in FIG. 12, the authentication server apparatus 30 performs the process of FIG. 6 based on the card ID read by the card information reading unit 15, and transmits a notification indicating that authentication is successful or a notification indicating that authentication has failed to the entry control unit 40. In response to receiving the notification that authentication is successful, the locking/unlocking unit 19 unlocks the door 41.

The authentication server apparatus 30 deletes an old record of the card management information through the process described in the first to third embodiments. Thus, the card management information is maintained irrespective of (or with low relevance) to a case where the IC card is used.

In addition, one or more embodiments of the present disclosure is applicable to maintenance of an IC card that is used when getting aboard on a mobile object such as an automobile, an IC card that is used when entering a membership restaurant, or an IC card that is used when entering a predetermined area outdoors, for example.

In addition, the functional configuration as illustrated in FIG. 5 is divided into blocks based on main functions of the electronic apparatus 10 and the authentication server apparatus 30, in order to facilitate understanding the processes performed by the electronic apparatus 10 and the authentication server apparatus 30. No limitation to a scope of the present disclosure is intended by how the processes are divided or by the name of the processes. The processes by the electronic apparatus 10 and the authentication server apparatus 30 can be divided to a larger number of processes depending on the contents of processes. Further, one process can be divided to include a larger number of processes. Further, an information processing apparatus that performs authentication and an information processing apparatus that performs maintenance can be separate apparatuses.

According to a conventional method of deleting information of an IC card disclosed, a user himself or herself has to manually delete the information of the IC card. Therefore, there is still a drawback that it is difficult to have all users to appropriately delete information of their own IC cards. In other words, when a user wants to delete information of an IC card that the user no longer uses, the user has to identify the IC card. This is not convenient. As a result, it is likely that information of an old IC card remains undeleted.

According to one or more embodiments of the present disclosure, an information processing apparatus capable of deleting information of unused cards is provided.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An information processing apparatus configured to communicate with an electronic apparatus to perform authentication of users for the electronic apparatus comprising:
    a processor configured to manage card-related information relating to cards used by the users for the authentication by,
    acquiring identification information of the cards,
    storing, in a memory of the information processing apparatus, the identification information of respective ones of the cards and timestamps in association with each other in response to authentication of the respective ones of the cards,
    storing, in the memory, card management information that associates, for each of the users, the identification information of the cards with identification information of a respective one of the users who owns the cards,
    storing, in the memory, user information that associates, for each of the users, the identification information of the respective one of the users with a set maximum number of cards that the respective one of the users can own,
    determining that one or more of cards are expired cards in response to the timestamps of the respective ones of the cards indicating that a predetermined time period has passed since the authentication of the respective ones of the cards,
    identifying, from the user information, the identification information of the respective one of the users associated with the expired cards,
    determining whether a number of cards associated with the respective one of the users associated with the expired cards exceeds the set maximum number of cards that the respective one of the users can own based on the card management information and the user information, and
    deleting, from the memory of the information processing apparatus, the card-related information associated with the identification information of a number of the expired cards such that the number of the cards of the respective one of the users associated with the expired cards does not exceed the set maximum number of cards that the respective one of the users can own.

2. The information processing apparatus of claim 1, wherein, the processor is configured to delete the card-related information associated with the identification information of the expired cards such that,
    when a first card used by a first one of the users is a non-expired card and a second card used by the first one of the users is one of the expired cards, the processor only deletes the card-related information associated with the identification information of the second card.

3. The information processing apparatus of claim 2, wherein
    the memory stores the card management information that associates, for each of the users, the identification information of the cards with the identification information of the respective one of the users who owns the cards, and
    the processor is configured to delete the card-related information associated with the identification information of the expired cards by,
        identifying, from the card management information, the identification information of the respective one of the users,
    delete the card-related information associated with the identification information of a respective one of the cards associated with the respective one of the users that is one the expired cards while maintaining the card-related information associated with the identification information of the respective one of the cards associated with the respective one of the users that are among non-expired cards.

4. The information processing apparatus of claim 1, wherein the processor is configured to delete the card-related information associated with the identification information of the expired cards in ascending chronological order so as to keep the number of the cards associated with the respective one of the users under the set maximum number of cards.

5. The information processing apparatus of claim 1, wherein the processor is configured to,
    receive, via a network, a setting indicating the predetermined time period, and
    store, in the memory, the predetermined time period.

6. The information processing apparatus of claim 1, wherein
    the predetermined time period is a periodic timing determined in advance.

7. An authentication system comprising:
    an electronic apparatus configured to receive authentication requests from users; and
    an information processing apparatus configured to manage card-related information relating to cards used by the users for authentication by,
        acquiring identification information of the cards,
        storing, in a memory of the information processing apparatus, the identification information of respective ones of the cards and timestamps in association with each other in response to acquiring authentication of the respective ones of cards,
        storing, in the memory, card management information that associates, for each of the users, the identification information of the cards with the identification information of a respective one of the users who owns the cards,
        storing, in the memory, user information that associates, for each of the users, the identification information of the respective one of the users with a set maximum number of cards that the respective one of the users can own, determining that one or more of cards are expired cards in response to the timestamps of the respective ones of the cards indicating that a predetermined time period has passed since the authentication of the respective ones of the cards, identifying, from the user information, identification information of the respective one of the users associated with the expired cards, determining whether a number of cards associated with the respective one of the users associated with the expired cards exceeds the set maximum number of cards that the respective one of the users can own based on the card management information and the user information, and deleting, from the memory of the information processing apparatus, the card-related information associated with the identification information of a number of the expired cards such that the number of the cards of the respective one of the users associated with the expired cards does not exceed the set maximum number of cards that the respective one of the users can own.

8. A method of operating an information processing apparatus, the information processing apparatus configured to communicate with an electronic apparatus to perform authentication of users, the method comprising:

acquiring identification information of cards used by users for authentication;

storing, in a memory of the information processing apparatus, the identification information of respective ones of the cards and timestamps in association with each other in response to acquiring authentication requests using the respective ones of cards;

storing, in the memory, card management information that associates, for each of the users, the identification information of the cards with identification information of a respective one of the users who owns the cards;

storing, in the memory, user information that associates, for each of the users, the identification information of the respective one of the users with a set maximum number of cards that the respective one of the users can own;

determining that one or more of cards are expired cards in response to the timestamps of the respective ones of the cards indicating that a predetermined time period has passed since authentication of the respective ones of the cards;

identifying, from the user information, the identification information of the respective one of the users associated with the expired cards;

determining whether a number of cards associated with the respective one of the users associated with the expired cards exceeds the set maximum number of cards that the respective one of the users can own based on the card management information and the user information; and deleting, from the memory of the information processing apparatus, card related information associated with the identification information of a number of the expired cards such that the number of the cards of the respective one of the users associated with the expired cards does not exceed the set maximum number of cards that the respective one of the users can own.

9. The information processing apparatus of claim 1, wherein the electronic apparatus is an image forming apparatus including a card reader configured to read the identification information of the cards and a network interface configured to exchange the identification information with the information processing apparatus, and the information processing apparatus is an authentication server configured to perform the authentication of the respective ones of cards such that the deletion of the card-related information associated with the identification information of the expired cards removes the card-related information from the memory of the authentication server.

10. The authentication system of claim 8, wherein the electronic apparatus is an image forming apparatus including a card reader configured to read the identification information of the cards and a network interface configured to exchange the identification information with the information processing apparatus, and the information processing apparatus is an authentication server configured to perform the authentication of the respective ones of cards such that the deletion of the card-related information associated with the identification information of the expired cards removes the card-related information from the memory of the authentication server.

11. The method of claim 9, wherein the electronic apparatus is an image forming apparatus including a card reader configured to read the identification information of the cards and a network interface configured to exchange the identification information with the information processing apparatus, and the information processing apparatus is an authentication server configured to perform the authentication of the respective ones of cards such that the deletion of the card-related information associated with the identification information of the expired cards removes the card-related information from the memory of the authentication server.

* * * * *